T. Williams,

Insect Trap.

No. 111,291. Patented Jan. 24, 1871.

Witnesses:
Gustave Dieterich
Alex. F. Roberts

Inventor:
T. Williams
per Munn & Co.
Attorneys

United States Patent Office.

THOMAS WILLIAMS, OF TOMPKINSVILLE, NEW YORK.

Letters Patent No. 111,291, dated January 24, 1871.

IMPROVEMENT IN ROACH AND BUG-TRAPS.

The Schedule referred to in these Letters Patent and making part of the same.

*To all whom it may concern:*

Be it known that I, THOMAS WILLIAMS, of Tompkinsville, in the county of Richmond and State of New York, have invented a new and improved Roach and Bug-Trap; and I do hereby declare that the following is a full, clear, and exact description thereof, which will enable others skilled in the art to make and use the same, reference being had to the accompanying drawing forming part of this specification.

Similar letters of reference indicate corresponding parts.

Figure 1:
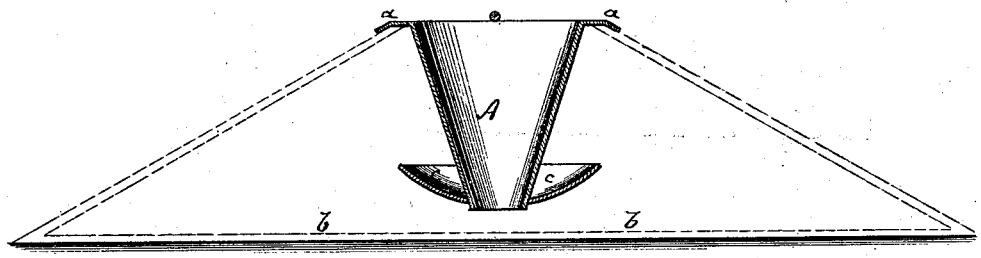
Figure 1 represents a vertical central section of my improved trap.
Figure 2:
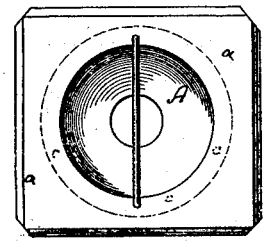
Figure 2 is a plan or top view of the same.

This invention relates to certain improvements in the roach and bug-trap for which Letters Patent of the United States, dated the 15th day of November, 1870, were issued to me.

The object of the present invention is to make the escape of the captured animals from the trap still more difficult than it was by the first-named trap.

The present invention consists in applying to the lower edge and outer side of the suspended funnel an annular flange, which constitutes a trough, in which liquid for preventing the escape of the animals may be contained.

A in the drawing represents the removable funnel, which is suspended from the perforated top or cover $a$ of the trap. This funnel is made of transparent or opaque material, and extends near enough to the bottom $b$ of the trap to allow the animals to readily enter the trap from and by means of said funnel; but still the lower edge of the funnel is far enough from the bottom to prevent the animals from reaching it from the bottom and escaping.

$c$ is a concave flange projecting from the lower part of the funnel outward from the same, constituting an annular trough for the reception of water or other liquid or substance, whereby the animals are prevented from reaching the lower edge of the funnel by crawling down the outer side of the same.

In my other trap, patented as aforesaid, this provision was not made; and some animals might have reached said lower edge of the funnel by crawling up on the side of the trap and then down on the outside of the funnel.

Having thus described my invention,

I claim as new and desire to secure by Letters Patent—

The annular trough $c$ filled with liquid, attached to the lower end of the funnel A, combined, as described, with the vessel in which the latter is placed, for the purpose of preventing the bugs from crawling around into the funnel.

THOMAS WILLIAMS.

Witnesses.
GEO. W. MABEE,
T. B. MOSHER.